US006407995B1

(12) United States Patent
Eryilmaz

(10) Patent No.: US 6,407,995 B1
(45) Date of Patent: Jun. 18, 2002

(54) INDEPENDENTLY SWITCHED VOICE AND DATA CALLS USING A SINGLE PSTN LINE CONNECTION

(75) Inventor: Erol Eryilmaz, Monmouth, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/911,119

(22) Filed: Aug. 14, 1997

(51) Int. Cl.[7] .................. H04L 12/66; H04M 11/00; H04M 3/42
(52) U.S. Cl. .............. 370/352; 370/386; 379/90.01; 379/201
(58) Field of Search ............. 370/352, 354, 370/356, 401, 465, 237, 384; 375/200, 222; 379/93.08, 211, 212, 309, 93.01, 215, 93.14, 419, 93.09; 345/327; 707/164; 348/14.09; 709/228

(56) References Cited

U.S. PATENT DOCUMENTS

| 5,392,345 A |   | 2/1995  | Otto ........................... 379/265 |
| 5,428,608 A |   | 6/1995  | Freeman et al. ............ 370/261 |
| 5,448,555 A |   | 9/1995  | Bremer et al. .............. 370/206 |
| 5,452,347 A |   | 9/1995  | Iglehart et al. ............. 379/199 |
| 5,483,530 A | * | 1/1996  | Davis et al. ................. 370/465 |
| 5,513,251 A |   | 4/1996  | Rochkind et al. ........ 379/93.25 |
| 5,592,538 A | * | 1/1997  | Kosowsky et al. ...... 379/93.08 |
| 5,625,677 A |   | 4/1997  | Feiertag et al. ............. 370/493 |
| 5,684,825 A | * | 11/1997 | Ko ............................. 375/222 |
| 5,742,596 A | * | 4/1998  | Baratz et al. ............... 370/356 |
| 5,742,773 A | * | 4/1998  | Bloomfield-Brown et al. ... 709/228 |

(List continued on next page.)

FOREIGN PATENT DOCUMENTS

| EP | 674420    | 9/1995 |
| GB | 2287610 A | 9/1995 |

OTHER PUBLICATIONS

Brosemer and Enright, *IEEE Communications Magazine*, "Virtual Networks: Past, Present and Future," 80–85 (Mar. 1992).

Elwalid et al., *Bell Labs Technical Journal*, "An Overview of the MultiMedia Communications eXchange (MMCX) and Its Performance Characterizatioon," 15–35 (Spring 1997).

"MultiMedia Communications eXchange," Administrator's Guide and Technical Reference, Release 2.0M, Issue 2 (Sep. 1997).

"MCK Analog Extender," MCK Communications Inc. (undated).

843 Technical Description (undated).

"Meridian Off–Premise Extender," *Installation Manual*, MCK Telecommunications Inc., Publication No. 843–TD1, (Mar. 17, 1995).

"Telecommunter Module User Guide," AT&T, AT&T Publication No. 555–001–701, Issue 1.1 (Jun. 1995).

"MultiMux Owner's Manual," Multi–Tech Systems, Inc. (1995).

Primary Examiner—Hassan Kizou
Assistant Examiner—John Pezzlo
(74) Attorney, Agent, or Firm—Synnestvedt and Lechner

(57) ABSTRACT

A data communication method is disclosed that enables the simultaneous transmission of voice and data over a single Public Switched Telephone Network (PSTN) line. A party to a data communication connection (hereinafter "the client") can accept and originate voice calls from and to anywhere on the PSTN while maintaining the data communication with the original destination (hereinafter "the server"). This is accomplished by adding additional functionality at the location of the server and by utilization of existing "Call Forwarding" and "Caller-Id" technology. The server manages voice calls to and from the client while the client and server are engaged in the data communication connection.

11 Claims, 3 Drawing Sheets

U.S. PATENT DOCUMENTS

| | | | | |
|---|---|---|---|---|
| 5,764,639 A | * | 6/1998 | Staples et al. | 370/401 |
| 5,805,587 A | * | 9/1998 | Norris et al. | 370/352 |
| 5,809,128 A | * | 9/1998 | McMullin | 379/215 |
| 5,862,211 A | * | 1/1999 | Roush | 379/309 |
| 5,870,465 A | * | 2/1999 | Hosbach et al. | 379/419 |
| 5,889,845 A | * | 3/1999 | Staples et al. | 379/211 |
| 6,320,915 B1 | * | 2/2000 | Bruno et al. | 348/14.09 |
| 6,044,108 A | * | 3/2000 | Bertness et al. | 375/222 |
| 6,064,653 A | * | 5/2000 | Farris | 370/237 |
| 6,163,536 A | * | 12/2000 | Dunn et al. | 370/352 |
| 6,173,044 B1 | * | 1/2001 | Hortensius et al. | 379/93.09 |

* cited by examiner

INDEPENDENTLY SWITCHED VOICE AND DATA CALLS USING A SINGLE PSTN LINE CONNECTION

BACKGROUND OF THE INVENTION

The present invention relates to data communications equipment and, more particularly, to the simultaneous transmission of voice and data over a single Public Switched Telephone Network (PSTN) line.

Simultaneous Voice and Data (SVD) technology permits simultaneous voice and data communications between a pair of users within the bandwidth provided by a single "plain old telephone service" (POTS) line. In operation, a high speed voice-band modem carries data in the usual manner. When either user wishes to communicate to the other by voice, a signal is sent via a standard V70 Protocol message. Once the other user acknowledges the message, a voice channel is opened and a portion of the total modem rate (e.g., 8 KB/S) is allocated for carrying the digitally compressed voice data. As a result, the two parties can simultaneously communicate by both voice and data. To be able to convert between analog data and compressed digital voice data, and to handle the signaling protocol, both parties must have SVD capability. The basic operation of an SVD modem is described in U.S. Pat. No. 5,448,555 to Bremer et al.

Technology has been developed which enables an SVD user to have a voice conversation and a data connection at the same time, but with different parties. Under this prior art technique, a central office (e.g. an inter-exchange carrier such as AT&T) of a PSTN provides a "local loop" SVD service in which both voice and data calls with the user co-exist over a POTS line, and the voice and data portions of these calls are routed to separate parties. To accomplish this result, the central office must include a modem pool that has both SVD-capable modems and standard (e.g., CCITT V.32 compatible) modems. A user with an SVD modem establishes an SVD link with the SVD modem of the central office. The SVD modem of the central office then separates the voice and data portions of the voice-band signal received from the local loop for separate transmission by the central office to different parties. The voice portion of the SVD signal receives standard voice-call handling from the central office for transmission to the party that is a part of the voice-call. The data portion of the SVD signal is routed through the standard modem of the central office for transmission to the party that is a part of the data-call. As a result, only the SVD user is required to have an SVD-capable modem, yet the SVD user can have both a voice connection and a data connection over a single "tip/ring" type telephone line. This kind of arrangement is described in U.S. Pat. No. 5,513,251 to Rochkind et al. and U.S. Pat. No. 5,625,677 to Feiertag et al., and in published European Patent Application No. EP 674,420 which cites U.S. patent application Ser. No. 216,373 as a priority application.

In the above described call-handling system, the central office of the PSTN must be equipped with the additional modems to be able to detect the type of incoming call (modem/voice or SVD) for a particular telephone number and process that call properly. This is very expensive because all of the central offices that want to provide this functionality must be upgraded to include SVD modems and standard data modems. If the central office to which User 1 is connected is not equipped with the specialized modems, User 1 cannot carry on this simultaneous voice and data communication with different parties. Further, the central office can accomplish the simultaneous voice/data communication only because it has the capability of establishing a local loop between the central office and the caller with the SVD modem.

SUMMARY OF THE INVENTION

Permits a first party (hereinafter "the client") to a data communication connection with a second party (hereinafter "the server") on a regular voice-band PSTN connection to accept and originate voice calls from and to anywhere on the PSTN while maintaining the data communication with the server. This is accomplished by adding additional functionality at the location of the server and by utilization of existing "Call Forwarding" and "Caller-Id" technology.

In one embodiment, the call handling is accomplished by the steps of establishing a SVD data connection between a first party and a second party; and establishing a voice call between the first party and a third party; wherein the voice call and the data call co-exist on a regular voice-band PSTN line between a switching system of said second party and terminal equipment of said first party, and the telephone number of said second party and the telephone number of said third party are different.

In a preferred embodiment all calls that are incoming to the first party are automatically forwarded to the second party; and the second party manages the connection of the voice-call between said first party and said third party. Upon initiation of a voice-call from said third party to said first party, said second party receives said incoming call from said third party; determines the identity of the calling party (said third party) and said party being called (said first party); and establishes a connection between said third party and said first party on the same regular voice-band PSTN connection that is being used for said data-call between said first party and said second party.

In a more preferred form, the second party comprises an internet service provider or a server independent of the PSTN.

In another embodiment, the additional step of establishing voice calls between a plurality of parties located at the same location as said first party and an equal number of parties located elsewhere is performed. For the duration of the SVD data connection, all calls that are incoming to the first party are forwarded to the second party, and the second party manages all incoming/outgoing calls to/from the first party by forwarding incoming calls to the first party over the PSTN line on which the SVD data connection is established and by forwarding all outgoing calls of the first party to a destination party over the PSTN line.

In an alternative embodiment, call handling is accomplished by establishing a data connection between a first party and a second party over a regular voice-band PSTN line; and for the duration of the data connection, all calls that are incoming to the first party are forwarded to the second party, and the second party manages all incoming/outgoing calls to/from the first party by forwarding all of the incoming calls to the first party to an incoming call processor.

A hardware embodiment of the present invention comprises a server for routing voice/data calls to/from a first SVD modem via a PSTN, the server comprising a second SVD modem, coupled to the PSTN, for receiving a transmission from the first SVD modem, the transmission having a voice channel and a data channel; a first caller identification circuit, coupled to the second SVD modem and to said PSTN, for identifying a party being called from the first SVD modem and a party calling to the first SVD modem; a second caller identification circuit, coupled to the PSTN;

and a controller, coupled to the second caller identification circuit and the second SVD modem, for controlling the routing of voice/data calls to/from the first SVD modem via the PSTN based on the identification made by the first and second caller identification circuits.

DETAILED DESCRIPTION OF THE INVENTION

Figure 1:
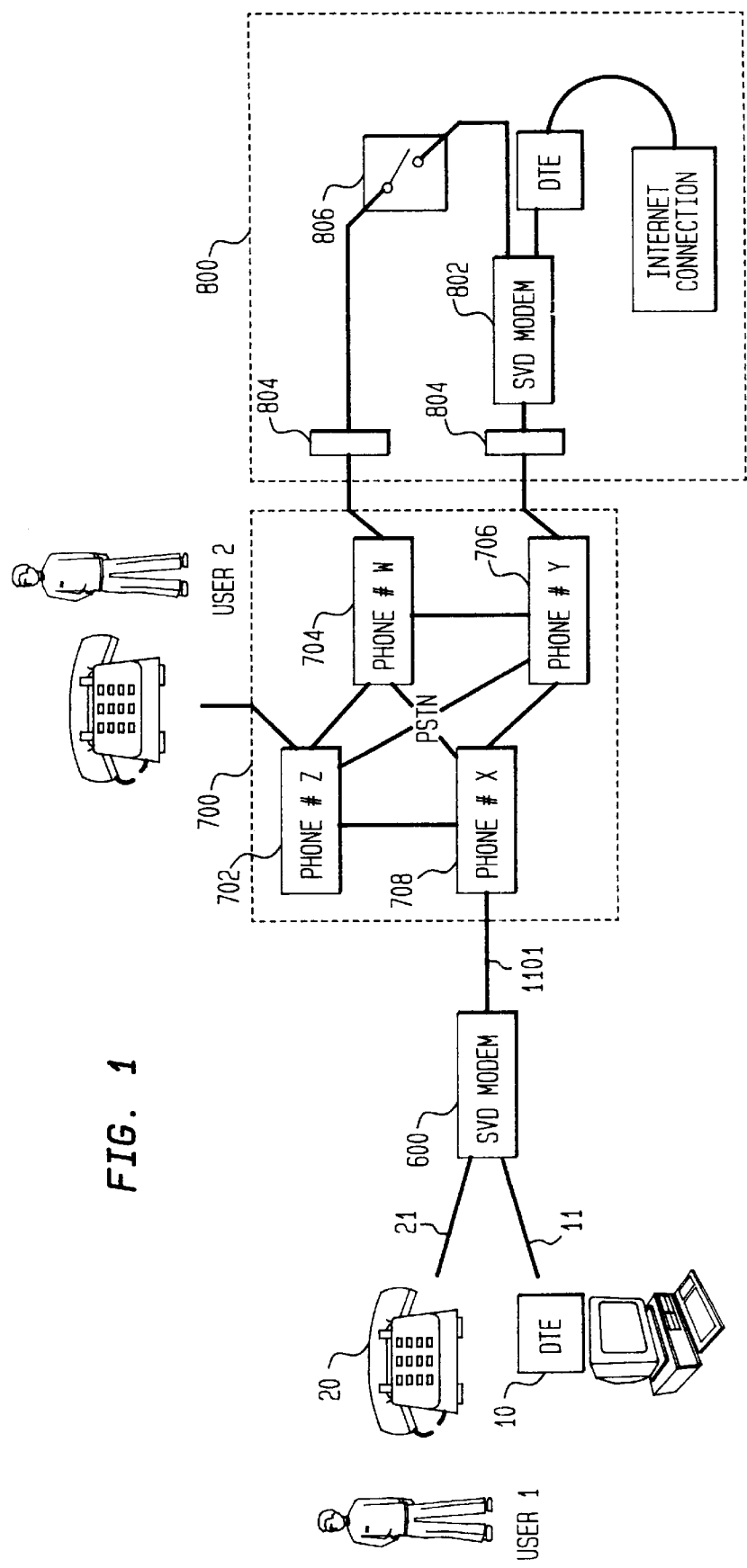
FIG. 1 is a block diagram of a communication system in accordance with the present invention.

Referring to FIG. 1, a client, e.g., User 1, is coupled to a PSTN 700 via SVD modem 600. PSTN 700 may comprise a series of separate but interconnected central offices 702, 704, 706 and 708 as shown. User 1 has a digital communication device, e.g., a terminal 10 and a voice-band audio communication device, e.g., telephone 20, each of which are connected to the SVD modem 600. A server, e.g., internet service provider (ISP) 800 provides an internet connection (data communication) to all of its subscribers, including User 1. As a service to its subscribers, ISP 800 uses an SVD modem 802 to connect to the PSTN 700. Thus, in a known manner, User 1 can conduct data communications and voice communications with the ISP 800. It should be understood that in actual application ISP 800 would be equipped with multiple SVD modems to enable servicing of multiple subscribers; for simplification of explanation, only a single SVD modem 802 is discussed herein.

In accordance with the present invention, to enable User 1 to send or receive voice communications with parties other than the ISP 800 while maintaining a data connection with the ISP 800, "Caller-Id" and "Call Forwarding", both standard features provided by all central offices associated with the PSTN 700, are utilized. Specifically, User 1 must subscribe to Call Forwarding and have all incoming calls forwarded to the ISP 800, at least when User 1 wishes to have the ability to conduct simultaneous voice and data communication. Further, the ISP 800 must subscribe to Caller-Id. By subscribing to Caller-Id, the ISP 800 will receive information about a calling party as well as the party being called by the calling party. Conventional Caller-Id detection equipment 804 is coupled to a switching processor 806 and also to SVD modem 802. Although shown as a separate block, the Caller-ID detection equipment 804 can be included with SVD modem 802 as a single unit.

Switching processor 806 provides several important switching functions and can be implemented using software in a conventional manner. For example, using the information detected by the Caller-Id detection equipment 804, the switching processor 806 can instruct SVD modem 802 to signal a ring request to the appropriate destination for an incoming call. When the user at the destination receives the ring request and decides to open the voice channel by lifting the receiver, this is detected by the switching processor 806 and it routes the incoming voice signal to the opened voice channel.

The operation of this system is now described. First, assume that there is a data connection between User 1 and ISP 800. In a first scenario, User 2 dials the telephone number of User 1 via telephone 22. On the PSTN 700, the central office associated with User 2 receives the call request (shown pictorially as a connection between telephone 22 and central office 702). Since User 1 has all incoming calls forwarded to ISP 800, central office 702 forwards the call to central office 704 associated with the ISP 800 (shown pictorially as a connection between central office 702 and central office 704) after being "advised" of the call forwarding status by central office 708. This incoming call is detected by the ISP 800 and the Caller-Id equipment 804 identifies the party calling (User 2) and the party being called (User 1). After making the identification, the ISP 800 sends a "voice channel open" request to User 1 via switching processor 806. The "voice channel open" request is a message that is sent from SVD modem 802 to SVD modem 600 using V70 protocol. Upon reception of this message, SVD modem 600 simulates a ring to User 1.

User 1 accepts the "voice channel open" request by lifting the hand-set of telephone 20. Upon receiving such acceptance, the switching processor 806 connects User 2 to User 1 via central office 706 and central office 708. Thus, the SVD modem of ISP 800 allocates a portion (e.g., 8 KB) of the data connection bandwidth to the voice-call between User 2 and User 1, while the remaining bandwidth (e.g., 16 KB) remains in use for the on-going data connection between the ISP 800 and User 1. As is well known, the incoming voice signal from User 2, which is analog, is converted to a digital signal by a conventional A/D converter or by appropriate A/D conversion circuitry included in SVD modem 802 before being transmitted to SVD modem 600. The signal is then converted back to analog via conventional D/A conversion circuitry.

In a second scenario, User 1, while connected to the ISP 800 via a data connection, desires to place a telephone call to another party, for example, User 2. To initiate the call, User 1 lifts the handset of telephone 20, thereby sending a V70 "voice channel open" request to the ISP 800. The ISP 800 accepts the request and establishes the voice channel with User 1. User 1 is then prompted to dial the outgoing call number (the telephone number of User 2) and, if required by the ISP 800, a password to authorize this service. The ISP 800 detects, from the dual tone multi-frequency (DTMF) tones corresponding to the numbers dialed by User 1, the information regarding the calling party (User 1) and the party being called (User 2) using the Caller-Id technology. Upon receipt of this information, the ISP 800 then routes the call to the party being dialed, in this case, User 2, via the various central offices as discussed above. In effect, the ISP 800 receives the attempt by User 1 to call User 2 and completes the connection by dialing User 2. As with the first scenario, a portion of the data connection is allocated to handle the voice call.

Figure 2:
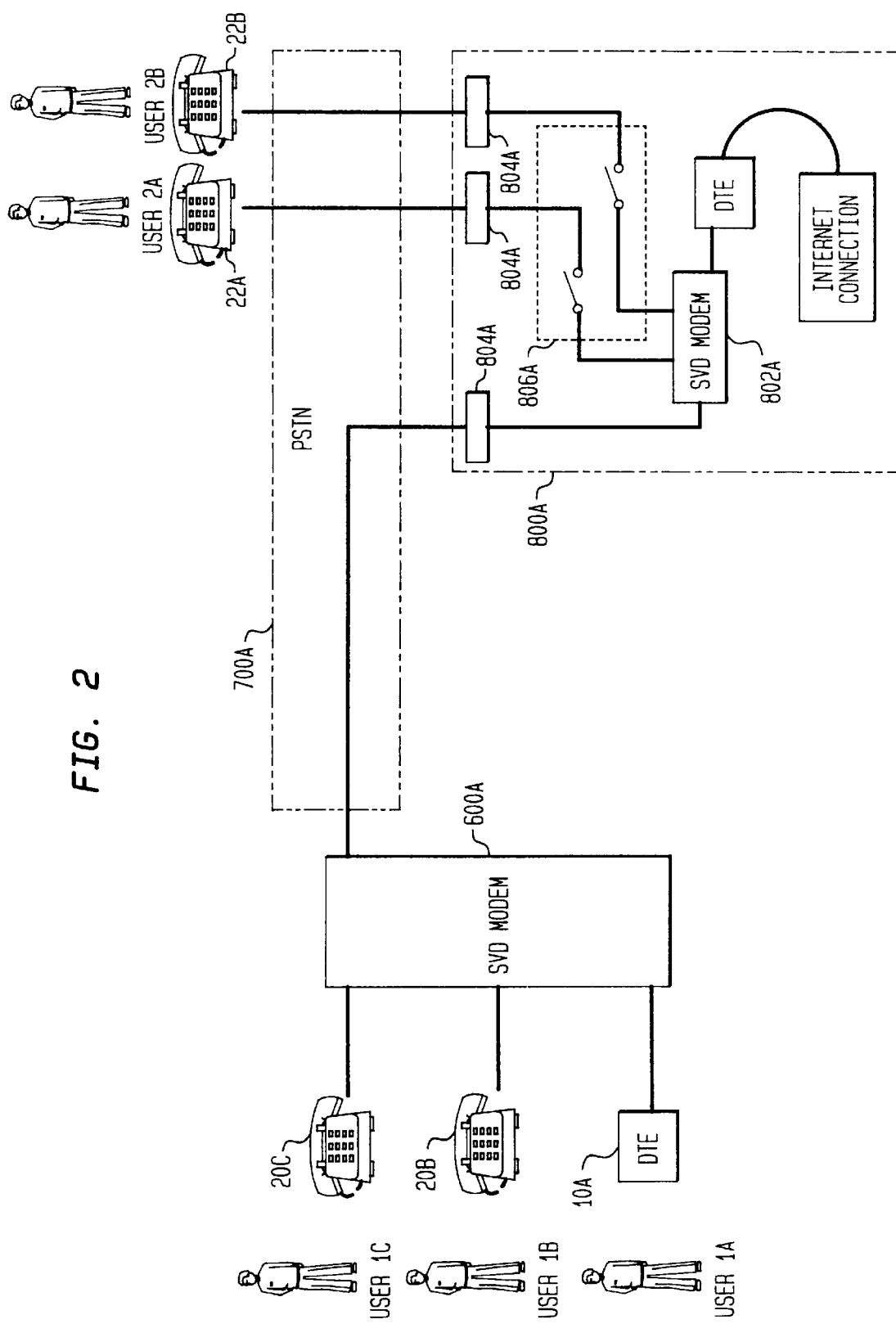
FIG. 2 is a block diagram of the communication system of the present invention showing a multi-user connection.

The present invention also has application in a multi-user SVD connection environment. Referring to FIG. 2, a multi-user SVD connection according to the present invention is shown. In this scenario, User 1A, User 1B, and User 1C are located in a common location, e.g., the same office. User 1A is connected to a data line e.g., the internet, via terminal 10A, SVD modem 600A, PSTN 700A and SVD modem 802A provided by the internet service provider. User 1B and User 1C have telephones 20B and 20C respectively, which enable them to send or receive voice data over the PSTN 700A. User 2A and User 2B are external users and are essentially equivalent to User 2 shown in FIG. 1.

User 1A connects to the internet in the same manner described with respect to FIG. 1. For simplicity of explanation, the details of the various central offices that may comprise PSTN 700A of FIG. 2 are not shown; however, the operation and structure of PSTN 700A are essentially identical to PSTN 700 shown in FIG. 1. If User 2A initiates a telephone call to User 1B, the central office associated with User 2A receives the call request and forwards the call to the central office associated with the ISP 800A, since User 1B has forwarded incoming calls to ISP 800A using Call-Forwarding technology. This incoming call is detected by the ISP 800A and the Caller-Id equipment 804A identifies the party calling and the party being called. After making the identification, the ISP 800A sends a "voice channel open" request to User 1B via switching processor 806A. User 1B accepts the "voice channel open" request by lifting the handset of telephone 20B. Upon receiving such acceptance, the switching processor 806A connects User 2A to User 1B. While this is occurring, User IC can make an outgoing call to User 2B. To initiate this call, User IC lifts the handset of telephone 20C and opens the voice channel to the ISP 800A. User 1C then dials the outgoing call number (telephone number of User 2B), and, if required by the ISP 800A, a password to authorize this service. The ISP 800A detects the information regarding the calling party and the party being called using the Caller-Id technology. Upon receipt of this information, the ISP 800A and switching processor 806A then routes the call to the party being dialed, in this case, User 2B.

The number of users that can simultaneously operate in the above manner depends only on the bandwidth available for the connection. Each voice channel takes some bandwidth away from the data connection. For example, if it is assumed that a connection rate of X Kbps exists, if three voice channels of Y Kbps are opened simultaneously, the data throughput will go down by a factor of X–3Y.

Figure 3:
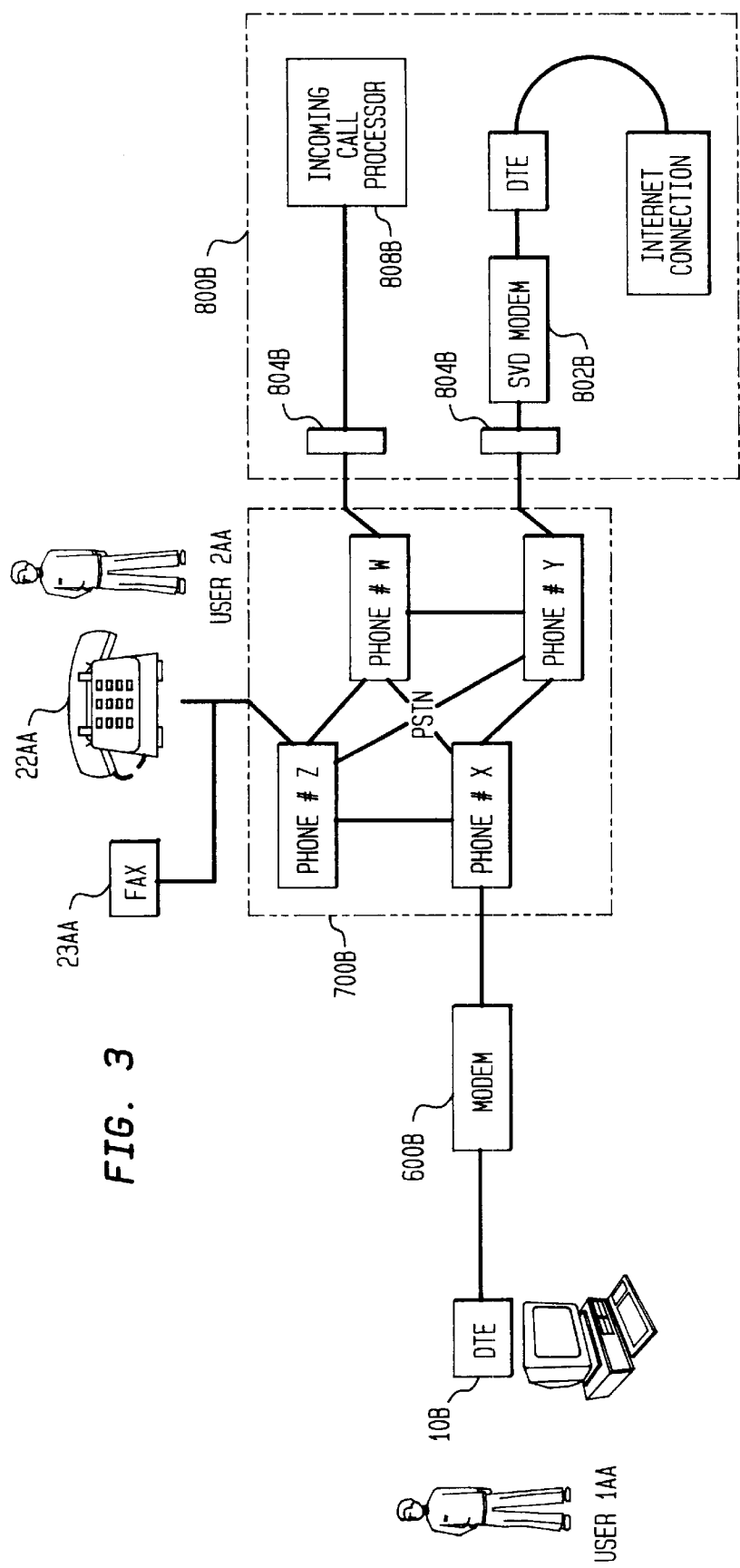
FIG. 3 is a block diagram of the communication system of the present invention in which non-SVD modems are utilized.

The above description describes the immediate connection of an incoming call to a user while that user is connected in a data connection (e.g., connected to the internet). However, situations may arise when the user connected to the data connection may wish to defer incoming calls (i.e, have them answered by voice-mail or other answering means) and/or receive an incoming facsimile transmission. Further, if SVD modems are not available, the user may, by necessity, have to defer incoming calls or fax transmissions. As shown in FIG. 3, the present invention can accomplish this without the need for an SVD connection. In FIG. 3, assume that User 1AA is connected to the internet service provided by ISP 800B via a standard data modem 600B and PSTN 700B. While connected to the internet, User 1AA has incoming telephone calls forwarded to ISP 800B using Call-Forwarding technology.

If User 2AA sends a fax to User 1AA by dialing User 1AA's telephone number, the incoming call is detected by Caller-Id equipment 804B at ISP 800B and the fax is received by ISP 800B and stored in a conventional manner (hard copy, in computer memory, etc) by incoming call processor 808B. User 1AA can access this fax via the internet or by other means provided by ISP 800B.

If the incoming call from User 2AA to User 1AA is a voice call, the call is forwarded to ISP 800B where it is stored via voice-mail, answering machine or other call storing device by incoming call processor 808B, so that the message is recorded. User 1AA can then access the message by placing an ordinary telephone call to ISP 800B.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

I claim:

1. A method for call handling comprising the steps of:
   establishing a SVD data connection between a first party and a second party, said second party comprising an internet service provider; and
   establishing a voice call between the first party and a third party, said first party using Call Forwarding to direct all incoming calls to said second party and said second party using Caller-ID to identify both said first and said third parties;
   wherein the voice call and the data call co-exist on a regular voice-band PSTN line between a switching system of said second party and terminal equipment of said first party, and the telephone number of said second party and the telephone number of said third party are different.

2. A method as set forth in claim 1, wherein all calls that are incoming to said first party are automatically forwarded to said second party; and
   wherein said second party manages the connection of said voice-call between said first party and said third party.

3. A method as set forth in claim 2, wherein said second party comprises a server independent of the PSTN.

4. A method is set forth in claim 3 wherein, upon initiation of a voice-call from said third party to said first party, said second party:
   receives said incoming call from said third party;
   determines the identity of the calling party (said third party) and said party being called (said first party); and
   establishes a connection between said third party and said first party on the same regular voice-band PSTN connection that is being used for said data-call between said first party and said second party.

5. A method as set forth in claim 1, further comprising the step of establishing voice calls between a plurality of parties located at the same location as said first party and an equal number of parties located elsewhere.

6. A method for call handling comprising the steps of:
   establishing a SVD data connection between a first party and a second party over a regular voice-band PSTN line, said first party using Call Forwarding to direct all incoming calls to said second party and said second party using Caller-ID to identify said first party, said second party comprising an internet service provider; and
   for the duration of said SVD data connection, said second party receiving all calls that are incoming to said first party, wherein said second party manages all incoming/outgoing calls to/from said first party by forwarding incoming calls to said first party over the PSTN line on which said SVD data connection is established and by forwarding all outgoing calls of said first party to a destination party over the PSTN line.

7. A method for call handling comprising the steps of:
   establishing a data connection between a first party and a second party over a regular voice-band PSTN line, said first party using Call Forwarding to direct all incoming calls to said second party and said second party using Caller-ID to identify said first party, said second party comprising an internet service provider; and
   for the duration of said data connection, said second party receiving all calls that are incoming to said first party, wherein said second party manages all incoming/ outgoing calls to/from said first party by forwarding all said incoming calls to said first party to an incoming call processor.

8. An internet service provider server for routing voice/data calls to/from an SVD modem via a PSTN, comprising:

receiving means for receiving a transmission from said SVD modem, said transmission having a voice channel and a data channel;

identification means for identifying a party being called from said SVD modem and a party calling said SVD modem, said identification means comprising Caller-ID; and control means for controlling the routing of voice/data calls to/from said SVD modem via said PSTN based on the identification made by said identification means, said control means comprising Call Forwarding.

9. An internet service provider server for routing voice/data calls to/from a first SVD modem via a PSTN, comprising:

a second SVD modem, coupled to said PSTN, for receiving a transmission from said first SVD modem, said transmission having a voice channel and a data channel;

a first caller identification circuit, coupled to said second SVD modem and to said PSTN, for identifying a party being called from said first SVD modem and a party calling to said first SVD modem, said first caller identification circuit using Caller-ID to perform said identification;

a second caller identification circuit, coupled to said PSTN, said second caller identification circuit using Caller-ID to perform an identification process; and a controller, coupled to said second caller identification circuit and said second SVD modem, for controlling the routing of voice/data calls to/from said first SVD modem via said PSTN based on the identification made by said first and second caller identification circuits, said controller using Call Forwarding in accomplishing said controlling function.

10. A server as set forth in claim 9, wherein said controller comprises a computer programmed to forward, to said first SVD modem via said second SVD modem, calls directed to said first SVD modem.

11. A server as set forth in claim 10, wherein said computer is further programmed to direct all outgoing calls from said first SVD modem to a destination party as determined by said first caller identification circuit.

* * * * *